United States Patent [19]

Degen et al.

[11] Patent Number: 4,665,050

[45] Date of Patent: May 12, 1987

[54] SELF-SUPPORTING STRUCTURES CONTAINING IMMOBILIZED INORGANIC SORBENT PARTICLES AND METHOD FOR FORMING SAME

[75] Inventors: Peter J. Degen, Huntington; Thomas C. Gsell, Levittown, both of N.Y.

[73] Assignee: Pall Corporation, Glen Cove, N.Y.

[21] Appl. No.: 640,447

[22] Filed: Aug. 13, 1984

[51] Int. Cl.$^4$ .................... B01J 20/28; B01J 20/26; B01D 39/14

[52] U.S. Cl. ........................ 502/402; 55/35; 55/387; 55/524; 210/496; 210/502.1; 210/506; 210/510.1; 264/122; 427/221; 502/159; 521/54; 523/218; 523/219

[58] Field of Search ............. 502/402, 415, 416, 159; 427/221, 222; 210/496, 497.01, 497.1, 497.2, 502.1, 504, 510.1, 506; 131/342, 443; 264/122

[56] References Cited

U.S. PATENT DOCUMENTS

| | | | |
|---|---|---|---|
| 2,059,983 | 11/1936 | Dent et al. | 264/DIG. 51 |
| 3,217,715 | 11/1965 | Berger et al. | 131/10 |
| 3,396,123 | 8/1968 | Urban | 252/428 |
| 3,474,600 | 10/1969 | Tobias | 55/124 |
| 3,531,558 | 9/1970 | Ganz | 131/343 |
| 3,611,678 | 10/1971 | Holden | 55/387 |
| 3,715,869 | 2/1973 | Holden | 55/387 |
| 3,746,655 | 7/1973 | Urbanic | 502/416 |
| 3,919,369 | 11/1975 | Holden | 264/45.1 |
| 4,061,807 | 12/1977 | Shaler et al. | 210/502.1 |
| 4,144,171 | 3/1979 | Krause | 210/496 |
| 4,210,540 | 7/1980 | Perrotta | 210/497 |
| 4,315,837 | 2/1982 | Rourke et al. | 502/402 |
| 4,535,005 | 8/1985 | Haas et al. | 427/221 |

FOREIGN PATENT DOCUMENTS

| | | |
|---|---|---|
| 0056724 | 7/1982 | European Pat. Off. . |
| 2624639 | 12/1977 | Fed. Rep. of Germany . |
| 1320337 | 6/1973 | United Kingdom . |
| 1561382 | 2/1980 | United Kingdom . |

*Primary Examiner*—P. E. Konopka
*Attorney, Agent, or Firm*—Leydig, Voit & Mayer

[57] ABSTRACT

A self-supporting structure comprising an inorganic sorbent and method for preparing is described in which the self-supporting structure is substantially free of sorbent fines and the sorption characteristics of the sorbent particles is retained. The process for immobilizing the sorbent particles in the self-supporting structure comprises the steps of:

(a) preheating inorganic sorbent particles to an elevated temperature;

(b) mixing the sorbent particles with particles of a polymeric binding material to form a mixture comprising the particles of polymeric binding material adhered to the sorbent particles; and (c) heating the mixture to about the solid-liquid transition temperature of the polymeric binding material with or without pressure to form a structure which upon cooling is self supporting.

8 Claims, No Drawings

SELF-SUPPORTING STRUCTURES CONTAINING IMMOBILIZED INORGANIC SORBENT PARTICLES AND METHOD FOR FORMING SAME

TECHNICAL FIELD

The present invention relates to structures in which inorganic sorbent particles are immobilized with a polymeric binding agent and to a process for forming the structures. More particularly, the present invention relates to a process for forming a self-supporting structure in which inorganic sorbent particles are immobilized with a polymeric binding material while maintaining the sorption characteristics of the inorganic particles.

BACKGROUND ART

In a variety of commercial and industrial settings, it is necessary to remove one or more components from a fluid, i.e., a gas or a liquid, before the fluid can be used for a particular purpose. For example, before contaminated water can be drunk, any chemical contaminants must be removed. Likewise, before compressed air can be used, for example to drive power tools, any water or water vapor must be removed or the tools will rust.

Must types of devices are available to remove one or more components from a fluid. One particularly effective class of devices characteristically comprises an apparatus which directs a flow of the fluid through a sorbent material, i.e,, a material which absorbs or adsorbs certain components. This sorbent material is typically in the form of a bed of sorbent particles which may be either loosely loaded or loaded under compression into a vertically oriented vessel. During a sorbing phase, the fluid containing the components is pumped at a certain pressure into either the top or the bottom of the vessel and then passed through the sorbent particle bed where the component is sorbed by the sorbent material. The fluid, now free of the component, is then removed from the other end of the vessel.

To extend the useful life of these sorbing apparatus, the sorbent bed is periodically regenerated, i.e., stripped of the component it has absorbed or adsorbed from the fluid. During a regenerating phase, the vessel is typically depressurized. Then, a heated and/or component-free fluid is flushed through the sorbent bed, purging the component from the sorbent particles. This purging fluid, now containing much of the component previously sorbed by the sorbent bed, is then exhausted. Once the sorbent bed is sufficiently free of the component, the vessel is repressurized and the fluid containing the component is again pumped through the vessel. The regenerated sorbent bed then continues absorbing or adsorbing the component from the fluid.

As effective as these apparatus are, they nevertheless have several undesirable characteristics. For example, they frequently generate significant quantities of sorbent dust, i.e., small fragments of the sorbent particles. Sorbent dust, which is extremely abrasive, can flow with the fluid through the end of the vessel. To withstand the destructive effect of this abrasive dust, any downstream pipes and valves are typically made of a heavier gauge than would otherwise be necessary and/or are specially designed to accomodate the severe conditions. Such pipes and valves significantly increase the weight and cost of the apparatus. These sorbing apparatus typically include a sorbent dust filter downstream from the sorbent bed to prevent migration of the sorbent dust. While the sorbent dust filter may collect much of the dust, it nonetheless adds to the mechanical complexity of the apparatus. It also increases both the maintenance and operational costs since the filter must be periodically cleaned or replaced.

Sorbent dust may be generated in a variety of ways. For example, when loading the sorbent particles into the vessel, the particles can abrade against one another, generating sorbent dust. They can also abrade against one another whenever the sorbent bed is jarred, e.g., when the sorbing apparatus is transported, or when it must be mounted where it is subjected to vibration, e.g., on board a ship. Further, once loaded, the sorbent particles at the bottom of the bed bear the weight of the entire sorbent bed and may be crushed into sorbent dust by the load. To avoid fragmenting or crushing sorbent particles, these sorbing apparatus characteristically use extremely hard particles which significantly limits the type of sorbent that can be used.

Sorbent dust may also be generated if the sorbent bed becomes fluidized, i.e., if the particles of sorbent are moved by the fluid passing through the bed. The moving sorbent particles may collide with and/or abrade against one another, generating the dust. To avoid fluidization in the sorbing phase, available sorbing apparatus maintain the velocity of the fluid at a very low level which, for some applications, significantly limits the amount of fluid that can be processed in a given amount of time. To avoid fluidization during the regenerating phase, the sorbing apparatus typically not only maintain the velocity of the purging fluid at a very low level but also depressurize and repressurize the vessel relatively slowly. This significantly increases the amount of time required for regeneration. Known sorbing apparatus also avoid fluidization by compressing the sorbent bed, e.g., by using springloaded mechanisms which bear against the top of the bed. Not only are these mechanisms frequently heavy and expensive but they further add to the load that the particles at the bottom of the bed must bear.

Another undesirable characteristic of known sorbing apparatus is that the sorbent bed, although initially loaded evenly, may develop channels since the sorbent particles may settle within the bed due to vibration or shock. These channels allow the fluid to bypass the sorbent particles and decrease the effectiveness of the sorbent bed in removing the component from the fluid. To minimize channelling, the vessels of known sorbing apparatus are generally oriented vertically. Vertical vessels, however, require supports, such as legs, to keep them upright. These supports, again, significantly increase both the weight and cost of the apparatus. Further, it is frequently desirable that these devices be portable. Since the center of gravity of a vertical vessel is much higher than that of a horizontal, the apparatus is more likely to tip over when moved. The development of an immobilized sorbent and a method of preparing such a sorbent which could be used in such systems would serve to alleviate the problems and difficulties discussed above.

DISCLOSURE OF INVENTION

The present invention provides structures and methods for producing such structures in which inorganic sorbent particles are immobilized within the structures and any tendency to form fines (fine particles of sorbent which inherently have a greater tendency to migrate), is substantially reduced or even virtually eliminated. The present invention is directed to self-supporting structures in which sorbent inorganic particles, including any sorbent fines present, are immobilized with a polymeric binding material.

The structures of the present invention substantially retain the inherent sorption characteristics of the sorbent particles with minimal increase in pressure drop across the structures, as compared with comparably sized beds of non-immobilized sorbent particles of the same type. The self-supporting structures also provide resistance to compressive or deformation forces (which resistance is lacking in non-immobilized sorbent particles) which allows the structures to be more easily handled and transported without substantial loss of structural integrity and without the production of fines due to particle-to-particle abrasion. Further, the requirement that the sorbent be hard, i.e., resistant to attrition, is negated since the sorbent in the structure of the present invention is held securely by the polymeric binding material, thereby substantially eliminating relative movement of the sorbent particles with resultant attrition and the production of fines. Stated in the alternative, because the sorbent particles are immobilized, a wide variety of sorbents (including softer ones than those previously considered satisfactory) may be used. Thus, the self-supporting immobilized sorbent structures in accordance with the present invention are suitable for treating a variety of gaseous and liquid materials.

Additionally, the sorbent structures in accordance with this invention may in general be desorbed or regenerated, making the structures adaptable for use in regenerable systems. The present invention then is directed to a process for immobilizing sorbent particles and forming a self-supporting structure therefrom having the properties described above, namely, the substantial elimination of mobility and loss of sorbent, as well as prevention of the formation of sorbent fines while providing a structure with a relatively low pressure drop across the structure and one that substantially retains the sorption characteristics of the sorbent particles themselves.

The process in accordance with this invention comprises the preheating of an inorganic sorbent prior to mixing with a polymeric binding agent to immobilize the sorbent. More specifically, it comprises the steps of:

(a) preheating sorbent particles, a major portion of which preferably have particle sizes in the range of from about 1 to about 10 millimeters, more preferably from about 2 to about 5 millimeters, (b) mixing the heated sorbent particles with a powdered polymeric binding material, the polymeric binding material preferably comprising from about 1 to about 7, more preferably 2 to 5, percent by weight, based on the total weight of the mixture, and wherein a major portion of the polymeric binding material preferably have particle sizes in the range of from about 8 to about 100 micrometers, thereby forming a mixture comprising particles of polymeric binding material adhered to the sorbent particles; and (c) heating the mixture to about the solid-liquid transition temperature of the polymeric binding material, preferably while applying pressure to the mixture, resulting, when the polymeric binding material has cooled, in a self-supporting structure in which the sorbent particles are immobilized while retaining sorbent properties.

The invention described herein also contemplates a self-supporting sorbent structure with a low pressure drop and high compressive strength comprising: prising:

inorganic sorbent particles, a major portion of which have particle sizes in the range of from about 1 to about 10 millimeters;

about 1 to about 7 percent by weight of a polymeric binding material, the percentage based on the total weight of the mixture of polymeric binding material and the sorbent particles. The structures have the ability to withstand compressive forces as high as about 50 psi, typically from 20 to 45 psi.

BEST MODES FOR CARRYING OUT THE INVENTION

Inorganic Sorbents

The sorbents which may be used in this invention are inorganic particulate materials, particularly inorganic oxides of aluminum, silicon and magnesium such as alumina, silica, magnesia, molecular sieves, zeolites, silica gel, and activated alumina. These materials are generally produced by thermal cycling of gels of the particular inorganic oxide.

In general, a major portion of the sorbent should have particle sizes in the range of about 1 to about 10 millimeters. With proper classification of the sorbent, the major portion generally constitutes 95 to 99.5 percent of the material. Most preferably, the average particle size of the sorbent particles is about 2 to about 5 millimeters. With finer particle size sorbent, relatively more binder is desirable because of greater external surface area available for bonding. Conversely, as the average particle size increases, a lesser amount of the binder is preferably used. However, there is a general correlation between the amount of binder used and the amount of fines which can be bound by the structure, i.e., reducing the amount of binder may reduce the quantity of fines which may be immobilized.

The specific surface area of the sorbent will generally be in the range of from about 200 to about 1,000 $m^2$/gram, more preferably from about 200 to about 500 $m^2$/gram. The bulk density of the sorbent is generally in the range of from about 0.5 to about 1.3 g/cc. When pressure is applied in the compressive step, an increase in the bulk density, commonly about 10%, will typically occur.

A preferred form of alumina for use in preparing structures in accordance with the present invention is an activated alumina available from Rhone-Poulenc Corporation, under the designation DE-4. This product is spherical in shape and a major portion of the particles have diameters in the range of from 2 to 5 millimeters. It has a surface area of about 317 $m^2$/gm. For the preferred activated alumina sorbents, the surface areas will generally lie in the range of from about 200 to about 500 $m^2$/gm.

Preferably, the sorbent particles are substantially spherical in shape to maximize the surface area of the sorbent and so that the resulting immobilized sorbent will combine a relatively small pressure drop associated with a high adsorptive ability. However, because of their spherical shape, the sorbent particles will not readily adhere to the polymeric binding material. Accordingly, by heating the sorbent particles prior to mixing with the binding material, the binding material particles become tacky upon mixing and adhere to the sorbent particles.

Polymeric Binding Material

As used herein, "polymeric binding material" or "binder" refers to either a thermoplastic or thermosetting polymeric material, preferably synthetic, which is capable of being shaped under the process conditions of the present invention.

The term "thermoplastic material" describes the preferred polymeric binding material of the present invention and generally refers to any polymeric material having thermoplastic properties and may include any synthetic or semi-synthetic condensation or polymerization product. Preferably, the thermoplastic material is a homopolymer or copolymer of a polyolefin. Most preferable are polyethylene and polypropylene, the former being particularly preferred.

Other thermoplastic materials include polystyrene, polycarbonates, polyurethanes, phenoxy resins, vinyl resins derived from monomers such as vinyl chloride, vinyl acetate, vinylidine chloride, etcetera, including polyvinyl chloride, copolymers of vinyl chloride with one or more of acrylonitrile, methacrylonitrile, vinylidine chloride, alkyl acrylate, alkyl methacrylate, alkyl maleate, alkyl fumarate, etcetera.

In some instances, to provide creep resistance, a thermosetting material may be preferred as the polymeric binding material. Suitable for this use are the type of cross-linked polyethylenes used as cable coatings, such as materials formed from blends of polyethylene with peroxide cross-linking agents, such as, for example, benzoyl or dicumyl peroxide present in catalytic amounts. Other examples include those materials in which a prepolymer is reacted with a cross-linking agent to form the product and includes polyurethanes of the type in which a "blocked" diisocyanate is reacted initially with a difunctional compound, such as a diol, to form the prepolymer which in turn is reacted with a trifunctional compound, such as a triol, to form, at the appropriate temperature, the cross-linked polymer. These thermosetting materials, which generally cross-link at temperatures between 100–200 degrees C., exhibit properties similar to the preferred crystalline thermoplastic materials discussed below.

The selection of polymeric binding material depends to some extent on the properties sought in the self-supporting structure which is formed in part from the binding material. That is, some of the mechanical properties of the immobilized sorbent structure are determined by the physical properties of the binding material. If, for instance, a structure which flexes or which resists fracturing is desired, a thermoplastic powder should be used which is not fully crystalline or below its glass transition temperature at the temperature at which the article is used. Conversely, a rigid structure requires a more crystalline thermoplastic or thermosetting material.

A requirement of the material selected as the polymeric binding material for use in the present invention is that it have a sufficiently high viscosity at the processing temperature so as not to flow and reduce the porosity of the sorbent by "blinding", as discussed below. As also described below, the heating step is conducted in such a manner as to cause the polymeric binding material to begin to soften so that the binder particles lose their original shape and become slightly tacky. The material should not, however, have a viscosity at the processing temperature such that it flows or blinding may result.

A major portion of the particles of the polymeric binding material should have average particle sizes in the range of about 8 to about 100 micrometers. When the particle sizes are significantly larger than the upper limit of this range, the powder demonstrates a tendency to settle and a higher weight percentage is required. This may also result, in some instances, in blinding, blinding referring to the tendency for the macropores of the sorbent particle to be covered over with the binding material thereby blocking them and preventing access to the internal micropores of the particle. If binder particle sizes significantly smaller are used, there is also some tendency for blinding to occur.

When thermoplastic materials are used in the present invention, particularly preferred are low density polyethylene powders such as those available commercially from USI Chemicals under the designations Microthene FN500, FN510 and FN524. These powdered polyethylene powders differ somewhat from one another in density and Vicat softening point. Microthene FN500 is somewhat crystalline and has a Vicat softening point of about 195 degrees Fahrenheit. This material provides the finished structure with substantial rigidity.

In addition, when a somewhat more flexible structure is desired, up to 10 percent of a second ethylenically unsaturated material, such as vinyl acetate, may be copolymerized with the ethylene to provide an amorphous thermoplastic binding material. A copolymer of this type exhibits less of a tendency to blind and also imparts some energy or shock absorbency properties to the immobilized sorbent structure, thereby reducing the tendency of the structure to fracture when handled with less caution than that required by some of the structures using more crystalline homopolymers. A suitable material of this type comprising 9 percent vinyl acetate copolymerized with polyethylene is available from USI Chemicals as Microthene FN532.

The binder is present suitably in an amount of about 1 to about 7, preferably about 2 to about 5, percent by weight, all percentages based on the weight of the total mixture comprising binder, sorbent particles and, preferably, a mixing aid.

An anti-agglomerating agent or mixing aid, such as fumed silica, is preferably added to the binder in order to inhibit adhesion between particles of the polymeric binding material. Usually, not more than 0.5% by weight of the mixing aid should be used (based on the total weight of the binder and the mixing aid).

Self-Supporting Immobilized Sorbent Structure

To form the self-supporting immobilized sorbent structure of the present invention, sorbent particles are preheated and then mixed with an appropriate amount, as indicated above, of polymeric binding material in any suitable manner. When contact is made between a binding material particle and a sorbent particle, some heat will be transferred from the preheated sorbent particle to the polymeric binder material particle, rendering the polymeric binder material particle tacky, so that the binder material particle will adhere to the sorbent particle. It is important that the temperature to which the sorbent particles are preheated does not greatly exceed the temperature at which the binding material particles become softened and take on a semi-liquid consistency, i.e., the solid-liquid transition temperature.

The mixture is then allowed to cool while it is mixed so that the binding material particles will become less tacky and will not adhere to one another (will be free flowing). However, the adhesion between particles of polymeric binding material and sorbent material will remain substantially unaffected by the decrease in temperature. An anti-agglomerating agent or mixing aid, such as fumed silica, may be combined with the binder prior to combining the binder with the sorbent to further inhibit adhesion between binding material particles.

The resulting dispersion will remain substantially uniform, since substantially all of the binding material particles will be adhered to a sorbent particle, and therefore, even though the binding material particles are generally smaller than the sorbent particles, due to their adhesion to the sorbent particles, they will not fall to the bottom of the mixing vessel.

It is usually unnecessary to use any particular precautions or undue care to avoid crushing the sorbent which would increase the fines content, during blending, since the polymeric binding agent is capable of retaining the fines. Care should be employed, however, when the sorbent particles already contain a significant amount of fines.

Once mixing has been completed and a substantially uniform mixture has been obtained, the mixture is preferably transferred to a mold having the particular volume and shape desired. Alternatively, the vessel in which the components are mixed can also serve as the mold.

Heat is then applied to the contents of the mold to provide an immobilized sorbent structure. Pressure may be applied while the mixture is at an elevated temperature to impart greater compressive strength to the structure. To immobilize the sorbent particles, particularly the fines, the particles should be effectively secured or trapped by the binder. Effective trapping of fines occurs (with the consequent increase in strength of the structure with the minimal reduction of sorptive properties) and the minimal increase in pressure drop results when the sorbent particles and fines are uniformly distributed in the self-supporting structure. This does not mean that each sorbent particle is completely enveloped in the polymeric binding material. On the contrary, it is preferred that each particle merely be held in place by the polymeric binding material. This may be accomplished by raising the temperature of the mixture to about the solid-liquid transition temperature of the binder to produce a suitable consistency in the polymeric binding material. Use of the proper temperature for a particular polymeric binding material causes that material to be softened and form a semi-solid or semi-liquid consistency. That is, the material is softened to the extent that no well defined binder particles exist which have the physical attributes of a solid yet the material does not flow as does a liquid. At this temperature or stage, termed herein as the "solid-liquid transition stage", which is about 50 to about 90 degrees Fahrenheit above the Vicat softening point, the polymeric binding material exhibits an increased tackiness. This tackiness, probably resulting from increased mobility of the molecular chains of the molecules, provides improved interparticle adhesion. The solid-liquid transition stage is not to be confused with a melting point in which solid and liquid phases exist in dynamic equilibrium with one another. At the solid-liquid transition stage, the polymeric binding material may be thought to be in a hybrid state between solid and liquid states. When at this stage, the mixture of polymeric binding material and sorbent particles may be compressed sufficiently by application of pressure to increase the number of contact points between adjacent particles and increase interparticle bonding, providing thereby increased compressive strength with retention of sorptive properties. The solid-liquid transition stage for a polymeric binding material is not as sharply defined as is the melting point of a pure crystalline material, and, in some instances, the temperature range of this stage is somewhat broad. However, it is still undesirable to use temperatures in the present process which are much above the temperature range of the solid-liquid transition stage since the polymeric binding material then exhibits the characteristics of a liquid in that it tends to readily flow. This is to be avoided since blinding of the pores of the sorbent may occur and formation of a mass or block of coated sorbent particles in which the sorption and gas permeability characteristics have been reduced or lost may also result.

The heat required to raise the temperature of the mixture of polymeric binding material and sorbent to the temperature at which the polymeric binding material is at its solid-liquid transition stage may be supplied by any conventional equipment, such as, for example, a forced hot air or convection oven, a heat jacketed mold, an infrared heater, or a heated roller or rollers. Depending on the apparatus used for heating the sample and the volume of the mold, heating to the solid-liquid transition stage may take from about 10 minutes to an hour or more.

The compressive or crush strength of the self-supporting structures increases as the magnitude of the pressure applied during the forming step at the solid-liquid transition stage is increased. Likewise, the pressure drop across the self-supporting structure increases as the magnitude of pressure applied to the sorbent/polymeric binding material mixture during formation of the structure is increased.

Pressure may be supplied to the mold by placement between two pressure rollers (calendering), by appropriate placement of a weight, by hydraulic means, such as by use of a piston, or by any other device and method known for application of pressure to a mold.

While the compressive pressure may be applied during or after elevation of the temperature to the solid-liquid transition stage, it is preferred to raise the temperature to, or very close to, the solid-liquid transition stage where the polymeric binding material is soft and about to flow prior to application of pressure. Once the mixture is raised to the temperature of the solid-liquid transition stage and thermal equilibrium is established, pressure is typically applied for from about 1 to about 10 minutes. The temperature of the mixture must be held within the range of the solid-liquid transition stage of the polymeric binding material for about the first minute during which the pressure is applied.

Pressures in the range of up to the crush strength of the sorbent, which is generally from about 100 to about 200 psi, may be used, albeit, from a practical perspective, from about 0.3 to about 50 psi are preferred, more preferably from about 0.3 to about 20. That is, generally the compressive strength of the self-supporting immobilized structure is directly related to the pressure applied at the solid-liquid transition stage. For most purposes, very high compressive strengths are not required. Thus, by using lower pressures during the process, simpler equipment may be employed and a self-supporting structure having adequate strength, particularly compressive or crush strength, to permit ease of handling and transport, as well as minimum pressure drop across the structure and maximum sorption characteristics, is achieved while substantially eliminating the formation of fines and retaining or immobilizing previously existing fines.

The resulting structure is capable of being desorbed or regenerated and therefore the sorptive capability of the sorbent can be reused, with the chance of the sorbent escaping being greatly reduced.

While the invention is susceptible to various modifications and alternative forms, certain specific embodiments thereof are described in the examples set forth below. It should be understood, however, that these examples are not intended to limit the invention to the particular forms disclosed but, on the contrary, the intention is to cover all modifications, equivalents and alternatives falling within the spirit and scope of the invention.

EXAMPLES

General Method For Preparation Of Examples 1 To 6

Examples 1 to 6 were prepared by essentially the same procedure as set out below. Specific differences in conditions or materials are noted below.

1000 gram portions of Rhone-Poulenc DE-4 activated alumina beads were weighed and placed in 2 liter glass jars. The activated alumina was generally of diameter from about 2 to about 5 millimeters. Each open glass jar was then placed in an oven, for about one hour, preheated to about 270 degrees Fahrenheit which temperature is approximately equal to the solid-liquid transition temperature of polyethylene, the polymeric binder powder being used.

Separate portions of Microthene FN500 and FN510 polyethylene powder from U.S. I Chemicals (Microthene FN500 and FN510 are both low density polyethylene; FN510 has a slightly higher Vicat softening point than FN500), were then mixed with fumed silica (Sipernat 17 from Degussa Corporation), which acts as an anti-agglomeration agent for the polyethylene so that the resulting mixture was 0.5 percent by total weight fumed silica. The homogenously blended mixture was then weighed into appropriate portions to be added to the pre-heated activated alumina.

The glass jars were then removed from the oven and the contents of each jar of hot alumina were transferred to separate 4 liter mixing vessels. Appropriate pre-weighed portions of Microthene/fumed silica were immediately blended into each vessel containing the hot alumina particles. Stirring was continued until the mix cooled to about 70 degrees Centigrade to ensure that the polyethylene powder had adhered to the alumina.

In order to mold the above material, a cylindrical mold of the desired dimensions was filled with the alumina/polyethylene/silica mixture. The mold was restrained on the top and bottom by perforated metal plates that were placed within the cylinder. The assembly was then placed in an oven pre-heated to a molding temperature at about the solid-liquid transition temperature of the polyethylene. After remaining at this temperature for about one hour, or until a uniform temperature was attained, the mold was removed from the oven and placed on a hydraulic press. Pressure was then applied for about one minute. The composition, molding temperature and pressure applied in each of the examples are shown in Table 1. The cooled immobilized activated alumina structures produced by the examples were found to be self supporting.

TABLE 1

| Example | Percentage of Polyethylene based on weight of Polyethylene/ Alumina/Fumed Silica Mixture (FN #) | Molding Temperature (Degrees Fahrenheit) | Compressive Pressure |
|---|---|---|---|
| 1 | 3.0 (500) | 260 | 10 psi |
| 2 | 5.0 (500) | 260 | 10 psi |
| 3 | 3.0 (510) | 275 | 10 psi |
| 4 | 5.0 (500) | 260 | 10 psi |
| 5 | 5.0 (500) | 260 | 0.3 psi |
| 6 | 3.5 (500) | 260 | 10 psi |

The following tests were performed on the immobilized activated alumina structures formed in the above examples:

I. Dynamic Water Sorption Test—Examples 1–3

This test measured the ability of a sorbent bed to remove water vapor from an airstream that was passed through the bed. In all instances, the airstream was provided at the same constant flow rate from a compressed air supply that had been filtered for both particulate and hydrocarbon gases.

Water vapor was supplied to this stream at the desired concentration by means of a medical type humidifier (available from Bennett Corporation).

The airstream flow rate through the bed was measured with a Model 1/2-21-G-10/80 flow meter (from Fischer and Porter Company). The flow rate through the sorbent bed test fixture determined the linear velocity and average gas residence time for a test.

The concentration of water vapor entering the sorbent bed was measured using a Hygrocon Model B (from Phys-Chemical Research Corporation) relative humidity meter. The temperature of the airstream remained constant at 24 degrees C.

The concentration of water vapor exiting the sorbent bed was measured using an Alnor Model 70004 dew point meter (from Alnor Instrument Company).

The sorbent bed to be tested was sealed in a test fixture having a cross sectional area of 9 square inches and a depth of 4.0 inches.

Tests were commenced by adjusting the airstream flow rate to the desired value, (as reported in the test results), and setting the relative humidity to 40%±3%. The test sample bed was then connected to the airstream at the inlet and to the dew point meter at the outlet. The dew point of the effluent from the test bed was then recorded at specific time intervals.

The results for the dynamic water sorption test are shown in Table 2.

TABLE 2

| Example | Airstream Linear Velocity | Outlet Dewpoint* | Outlet $H_2O$ Vapor Concentration (lb/1000 ft$^3$)* | Efficiency of $H_2O$ Vapor Removal |
|---|---|---|---|---|
| Control | 25 feet per min. | −38° F. | .0011 | 99.85% |
| 1 | " | −50° F. | .00062 | 99.90% |

TABLE 2-continued

| Example | Airstream Linear Velocity | Outlet Dewpoint* | Outlet H$_2$O Vapor Concentration (lb/1000 ft$^3$)* | Efficiency of H$_2$O Vapor Removal |
|---|---|---|---|---|
| 2 | " | −40° F. | .0010 | 99.85% |
| 3 | " | −40° F. | .0010 | 99.85% |

*After 5 minutes
Note:
Inlet water vapor was constant at 0.7 lb/1000 ft$^3$

The control structure constituted a granular bed of the same dimensions (3.4 inch O.D.×4.0 inches deep), as the immobilized sorbent structures, however the control contained no Microthene binding material. Following the control test, the activated alumina was removed from the control bed, dried, and used to prepare the immobilized structure of Example #1.

The results show that the efficiency of removal of water vapor was nearly identical for the control and for the immobilized examples.

II. Compressive Strength Test

The compressive strength test measured the ability of the immobilized sorbent beds to resist failure when subjected to compressive force.

The force applied to the samples during the test was measured by a digital force gauge. In these examples, a Chatillion Model EFG 100, whose readout is designed to directly read the pressure per square inch in pounds, was used to measure the compressive force.

Samples in the form of cylinders about 1 inch in diameter and 1.5 inches in length were restrained on each end by 1 inch diameter circular plates, one movable, the other fixed, attached to the force gauge. The movable plate was gradually moved toward the stationary plate, thereby increasing the force applied to the test sample. The value reported in Table 3 under the heading "Compressive Strength" is the value of the applied compressive force (in psi) at which deformation of the test sample was first observed.

Test samples for Examples 4 and 5 (two of each) were prepared following the General Method, as described above and tested.

TABLE 3

| Example | Compressive Pressure (During Molding) (psi) | Compressive Strength (psi) |
|---|---|---|
| 4 | 10 | 42 |
| 4 | 10 | 34 |
| 5 | 0.3 | 24 |
| 5 | 0.3 | 26 |

The results indicate that higher compressive strengths for immobilized sorbent beds can be achieved by applying higher pressures during molding. The compressive strength of the non-immobilized sorbent is not measurable because the material is mobile and not self supporting.

III. Dust Release Test

The Dust Release Test was designed to measure the amount of sorbent particles lost from a sample when subjected to a constant vibration.

The apparatus used to perform the test consisted of three cylinders placed with their openings in series and secured to one another by a clamp. Rubber gaskets were used to separate each of the cylinders. In the first cylinder, a high efficiency Emflon ® air filter manufactured by Pall Corporation was included and in the third or last cylinder a nylon 66 collection membrane having a 0.8 μm absolute pore rating was located. The sample being tested, having been formed according to the General Method and having an outer diameter of 3.4 inches and a length of 1.3 inches, was placed in the intermediate or second cylinder. The cylinders were secured to a vibrating dental table which was adjusted to provide a vibrating force of 4 G. Additionally, a vacuum for drawing air through the cylinders at a specified flow rate from the high efficiency air filter cylinder in the direction of collection was provided.

The nylon 66 membrane was weighed and mounted in the collection cylinder. The cylinders were then clamped together and secured to the table. Vibration and air flow through the apparatus were initiated simultaneously, the air flow rate having been adjusted to 8 liters per minute.

The test was conducted for 60 minutes, after which the collection membrane was removed and reweighed, the difference in weight being the amount of sorbent lost by the sample.

TABLE 4

| Sample Prepared By Example | Sorbent Loss (mg) |
|---|---|
| 6 | <0.1 |
| Control (non-immobilized activated alumina) | 33.2 |

As the above results indicate, loose activated alumina particles (as in the control test) contain or release large amounts of dust or fines. However, the immobilized sorbent beds prepared in accordance with the present invention resulted in a substantially reduced amount of fines.

The temperature to which the sorbent particles are preheated is determined by consideration of a number of factors. The primary criterion is that the binder particles when added to the preheated sorbent particles should be heated (by heat transfer) to a temperature sufficiently high that they become sufficiently tacky to adhere to the sorbent particles while not becoming so tacky that they bind the sorbent particles together and preclude free flow of the sorbent particles upon cooling. That is, the temperature to which the sorbent particles are heated should not be so high as to result in the binder material particles adhering to each other to such an extent that the sorbent particles are not free flowing upon cooling. The temperature to which the sorbent particles are heated should take into account any heat loss from the particles prior to mixing with the sorbent. For example, if mixing is initiated immediately, then the heat loss will be minimal and a lower temperature will be required. Also, the relative heat capacities of the sorbent and the binder material as well as the relative amounts of the sorbent and the binder material are factors to be considered. That is, the more binder that is used, the more will be the amount of the heat required to obtain the requisite level of tackiness to ensure adhesion of the binder particles to the sorbent particles. Similarly, as the heat capacity of the binder increases and/or the heat capacity of the sorbent decreases, the temperature to which the sorbent is heated should be increased. Conversely, as the heat capacity of the binder decreases and/or the heat capacity of the sorbent increases, the temperature to which the sorbent is heated should be decreased.

Typically for the preferred low density, polyethylene binder, the sorbent is heated to a temperature of from about 250 to about 280 degrees Fahrenheit.

We claim:

1. A process for immobilizing inorganic sorbent particles with a polymeric, thermoplastic binding material, the process comprising:
   (a) preheating the inorganic sorbent particles, the major portion of which have particles sizes in the range of from about 1 to about 10 millimeters, to an elevated temperature;
   (b) mixing the heated sorbent particles with particles of the polymeric, thermoplastic binding material to form a mixture comprising from about 1 to about 7% polymeric, thermoplastic binding material based on the weight of the mixture, the particles of polymeric, thermoplastic binding material being adhered to the sorbent particles; and
   (c) heating the mixture to about the solid-liquid transition temperature of said polymeric, thermoplastic binding material with or without pressure,
   thereby forming a structure which, upon cooling, is self-supporting, in which the formation of sorbent fines is substantially eliminated and in which the sorption characteristics of the inorganic sorbent particles are substantially retained.

2. The process of claim 1 wherein the solid-liquid transition temperature is 50 to 90 degrees Fahrenheit above the Vicat softening point of the polymeric, thermoplastic binding material.

3. The process of claim 1 wherein a major portion of the particles of said polymeric, theremoplastic binding material has particles sizes in the range of about 8 to about 100 micrometers.

4. The process of claim 1 wherein pressure from about 0.3 to about 50 psi is applied in step (c).

5. The process of claim 1 wherein said polymeric, thermoplastic binding material comprises a polyolefin.

6. The process of claim 5 wherein said polyolefin comprises polyethylene.

7. The process of claim 1 wherein said inorganic sorbent particles comprise alumina.

8. The process of claim 1 wherein said polymeric, thermoplastic binding material is low density polyethylene, a major portion of which has particle sizes in the range of about 8 to about 100 micrometers and is present in an amount of from about 2 to about 5% by weight, based on the weight of said mixture, said sorbent is heated to a temperature of from about 250 to about 280° Fahrenheit prior to mixing with said polymeric, thermoplastic binding material and a pressure of from about 0.3 to about 20 psi is applied to said mixture while said mixture is at a temperature of about 50 to about 90 degrees F. above the Vicat softening point of said polymeric, thermoplastic binding material.

* * * * *